(12) United States Patent
Hardacker et al.

(10) Patent No.: US 8,315,332 B2
(45) Date of Patent: Nov. 20, 2012

(54) SYSTEM AND METHOD FOR TRANSMITTING DATA USING QUANTIZED CHANNEL RATES

(75) Inventors: Robert Hardacker, Escondido, CA (US); Robert A. Unger, El Cajon, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 929 days.

(21) Appl. No.: 12/399,837

(22) Filed: Mar. 6, 2009

(65) Prior Publication Data

US 2010/0226466 A1    Sep. 9, 2010

(51) Int. Cl.
*H04L 27/00* (2006.01)
(52) U.S. Cl. ........ 375/295; 375/296; 375/299; 375/260; 375/267; 375/347; 375/349
(58) Field of Classification Search ................... 375/295, 375/296, 299, 260, 267, 347, 349
See application file for complete search history.

(56) References Cited

U.S. PATENT DOCUMENTS

| 7,215,831 | B2 | 5/2007 | Altunbasak et al. | |
| 7,228,154 | B2 | 6/2007 | Champion et al. | |
| 7,366,271 | B2 | 4/2008 | Kim et al. | |
| 8,125,976 | B2* | 2/2012 | Chang et al. | 370/350 |
| 2003/0058955 | A1* | 3/2003 | Raghavan | 375/265 |
| 2006/0153572 | A1 | 7/2006 | Champion et al. | |
| 2007/0030797 | A1* | 2/2007 | Baek | 370/208 |
| 2008/0170644 | A1* | 7/2008 | Kleider et al. | 375/343 |
| 2009/0310712 | A1* | 12/2009 | Nakatani | 375/316 |

FOREIGN PATENT DOCUMENTS

| EP | 1906357 | 4/2008 |
| WO | WO00/59206 | 10/2000 |

OTHER PUBLICATIONS

*Toshiba upconverting HDTV's announced*, Marteen Madison, Sep. 23, 2008 (http://www.cdfreaks.com/news/15045-Toshiba-upconverting-HDTVs-announced.html).
*Hitachi Claims Advanced Resolution Enhancement Technology*, Shinya Saeki et al., Sep. 25, 2008 (http://techon.nikkeibp.co.jp/english/NEWS_EN/20080925/158467/).

* cited by examiner

*Primary Examiner* — Kabir A Timory
(74) *Attorney, Agent, or Firm* — Fitch, Even, Tabin & Flannery, LLP

(57) ABSTRACT

A quantized channel rate and corresponding rate multiplier is determined on a transmitter-side of a communication system based on a measured minimum required bandwidth. In certain embodiments, the quantized data rate may be an integer multiple of the system's reference clock. The determined rate multiplier is then transmitted to the receiver-side at a default data rate prior to or near the beginning of a data transmission session, such as upon initialization. Prior to transmission, the data stream may be padded with some determined amount of null data such that the actual transmitted data rate is approximately equal to the quantized channel rate, and the receiver-side can readily recover the data clock using its known reference clock and the previously-provided rate multiplier.

22 Claims, 7 Drawing Sheets

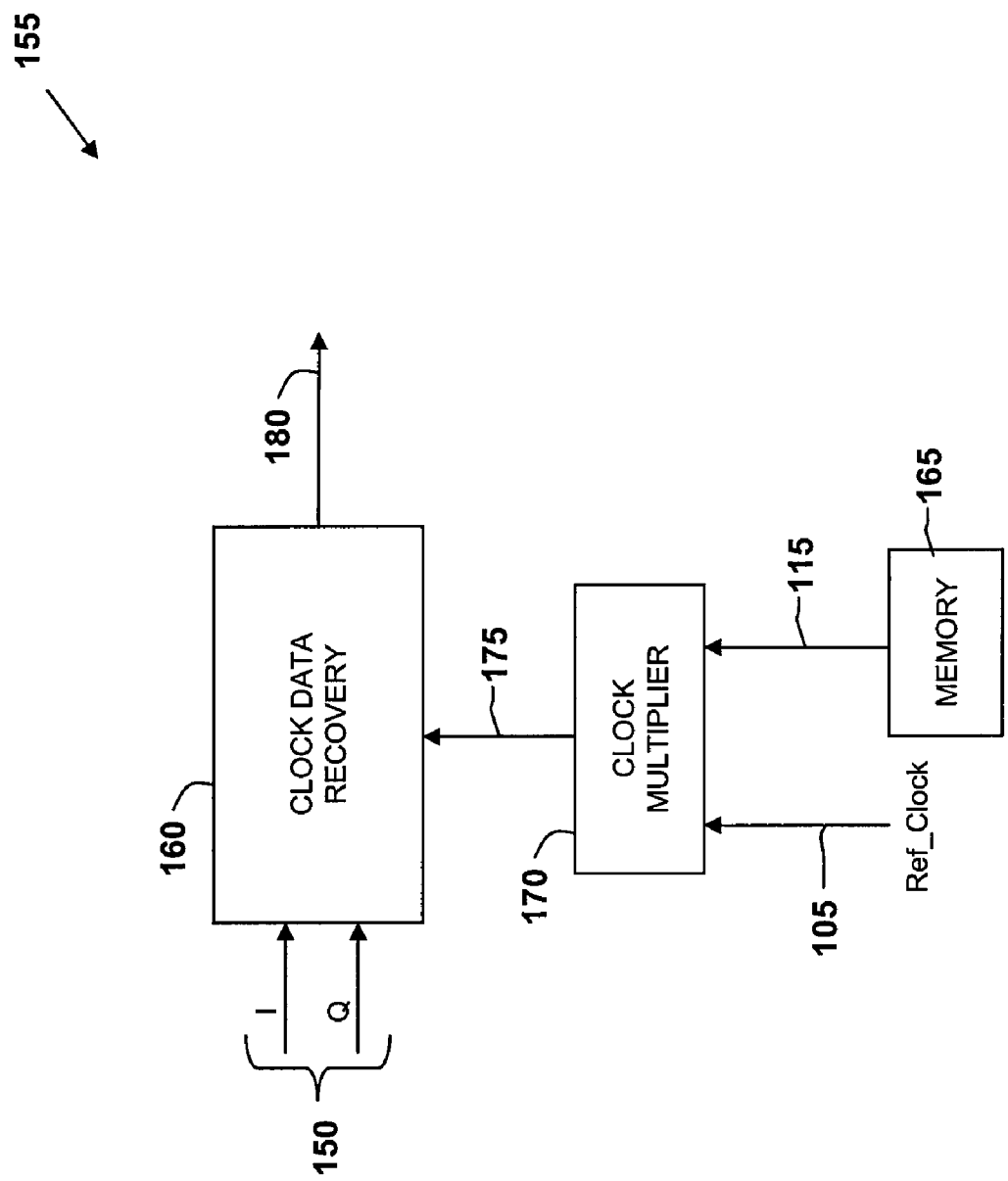

SYSTEM AND METHOD FOR TRANSMITTING DATA USING QUANTIZED CHANNEL RATES

FIELD OF THE INVENTION

The invention relates in general to data transmission, and in particular, to transmitting data using quantized channel rates.

BACKGROUND OF THE INVENTION

There are ever increasing applications which require transmission of high rate data, such as high definition video, over both wired and wireless channels. The effective channel rate is a function of the channel condition (noise), distance and the power/sensitivity capabilities of both the transmitter and receiver. A shortcoming in one must be made up by a strength in another. For example, based upon its sensitivity, a receiver must be close enough to the transmitter to "hear" it correctly. If the channel condition is noisy, however, then that maximum distance may be reduced. The transmitter's power can also be increased to overcome channel limitations, distance and/or receiver sensitivity. Coding schemes may reduce (or even increase) the signal-to-noise ratio (SNR) for a particular signal. As the number of bits per symbol increases, so do the SNR requirements. Conversely, lower bits per symbol can typically tolerate more signal noise. In general, lower channel rates tend to have better noise immunity and/or range.

In certain wired communication links (e.g., Ethernet) and most wireless links, no separate data clock is transmitted from the transmitter-side to the receiver-side and, accordingly, various techniques have been employed on the receiver-side to recover the data clock from the transmitted signal. For example, the receiver-side may generate a clock based on a reference frequency, and then phase-align this clock to the transitions in the data stream with a phase-locked loop (PLL). This process is commonly known as "clock and data recovery" (CDR). In order for CDR to function properly, a data stream should transition frequently enough to correct for any drift in the PLL's oscillator. Thus, it is necessary to employ an encoding scheme that ensures frequent transitions.

In the context of communications with varying channel rates, CDR requires an infinitely greater amount of processing since the receiver-side will have essentially no information regarding the incoming data. Thus, there is still an unsatisfied need for a system and method for transmitting data using quantized channel rates in order to simplify the process of performing CDR.

SUMMARY OF THE INVENTION

Systems and methods for transmitting data over a communication link between a transmitter-side and receiver-side of a communication system using quantized channel rates are disclosed and claimed herein. In one embodiment, a method comprises determining a minimum required bandwidth for a data stream on the transmitter-side of the communication system, and determining a quantized channel rate based on the minimum required bandwidth, where the quantized channel rate is equal to the product a reference clock of the communication system multiplied by a rate multiplier. The method further includes transmitting the rate multiplier to a receiver-side of the communication system at a default data rate, determining an amount of null data based a difference between the quantized data rate and minimum required bandwidth, padding the data stream with the determined amount of null data, and then transmitting the data stream padded with null data at the quantized channel rate over the communication link.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 1B is a system diagram of one embodiment of receiver-side clock circuitry configured in accordance with the principles of the invention;

DETAILED DESCRIPTION OF THE EXEMPLARY EMBODIMENTS

Overview of the Disclosure

Figure 1A:
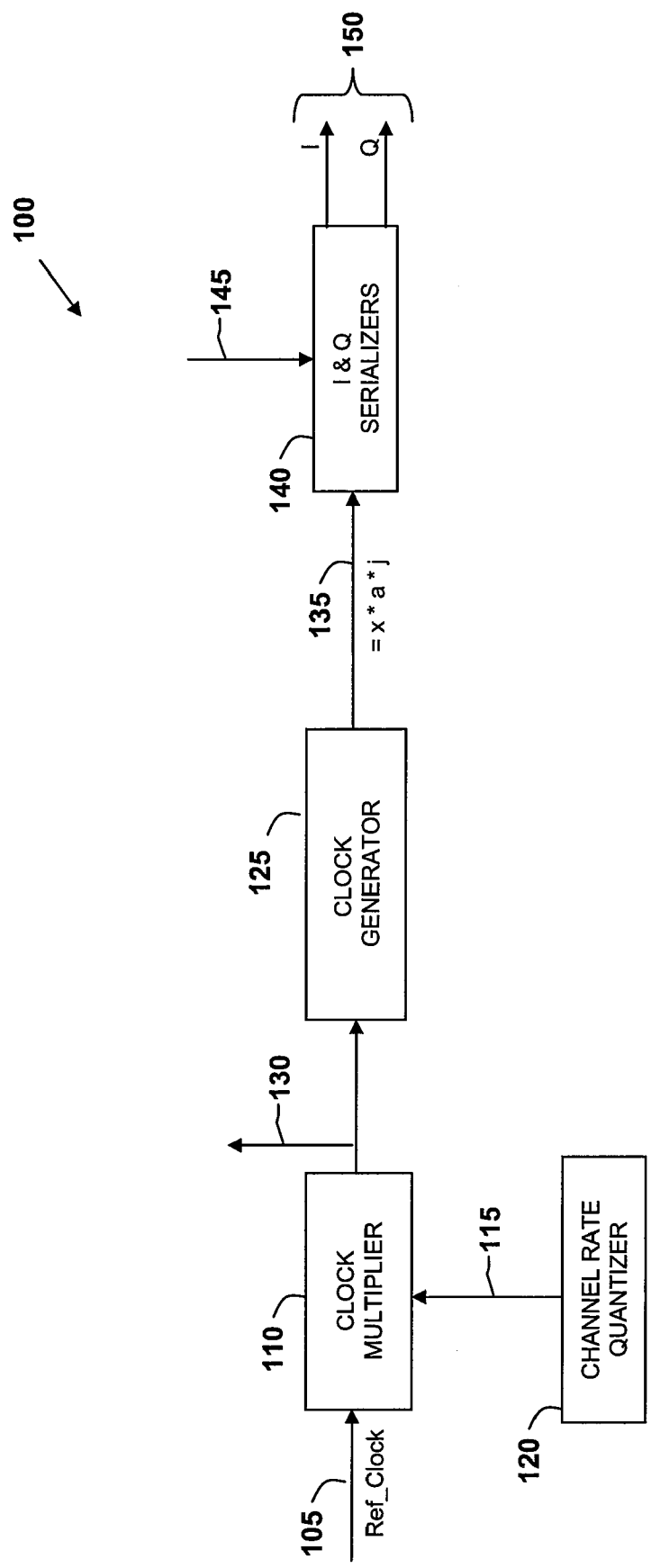
FIG. 1A is a system diagram of one embodiment of transmitter-side clock circuitry configured in accordance with the principles of the invention.

The disclosure relates to a transmitter-receiver system in which data is transmitted over a communication link, which may be either a wired or wireless link. Certain embodiments of the invention are particularly applicable to communication systems having variable data transmission rates and/or which do not otherwise transmit a separate data clock from the transmitter-side to the receiver-side, thereby requiring the receiver-side to perform CDR. In particular, the following disclosure relates to determining a quantized channel rate and corresponding rate multiplier on a transmitter-side of a communication system based on a measured minimum required bandwidth. The quantized data rate may be an integer multiple of the system's reference clock, but may similarly be equal to a non-integer multiple of the reference clock.

In another embodiment, rather than determining a quantized channel rate and corresponding rate multiplier, a particular "mode" of communication may instead be determined, where such mode corresponds to a predetermined quantized channel rate.

As will be described herein, the determined rate multiplier may be transmitted to the receiver-side at a relatively slow "default rate" prior to or near the beginning of a data transmission session, such as upon initialization. In order to assist the receiver-side in performing a CDR process, the data stream may be padded with some determined amount of null data such that the actual transmitted data rate is approximately equal to the quantized channel rate, and the receiver-side can readily recover the data clock using its known reference clock and the previously-provided rate multiplier. Padding the data stream with null data may also ensure that frequency transitions occur in the data stream so as to improve the phase-alignment process of the data clock.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

Description of the Exemplary Embodiments

Referring now to FIG. 1A, depicted is one embodiment of transmitter-side clock circuitry 100 configured to implement at least one aspect of the invention. Clock circuitry 100 may be used on a transmitter-side of a data communication system, and has particular relevance in communication systems which have a variable data transmission rate, and/or which do not transmit a separate data clock from the transmitter-side to the receiver-side, thereby requiring the receiver-side to recover a data clock from the transmitted signal.

As shown in FIG. 1A, a reference clock (Ref Clock 105) is provided as an input to a clock multiplier 110. It should be appreciated that the Ref_Clock 105 may be 55 MHz, 110 MHz or any other reference frequency that is otherwise known and/or used by both the transmitter-side and receiver-side of the communication system in question. The clock multiplier 110 further receives a numeric value, referred to as the channel rate multiplier (CRM) 115, from the channel rate quantizer 120. As will be described in more detail below with reference to FIGS. 2 and 3, the CRM 115 is a computed numerical value that corresponds to a selected quantized channel rate for data transmission. In order to simplify processing, the CRM 115 may be an integer value, or may similarly be a non-integer numerical value.

In certain embodiments, the clock multiplier 110 is configured to multiply the Ref_Clock 105 by the CRM 115 and to provide the product to the clock generator 125. A data clock 130 may also be provided to a controller and/or other processing circuitry for clocking data through other transmitter-side circuitry, as is generally known. As will also be described in more detail below with reference to FIGS. 2 and 3, in certain embodiments the CRM 115 may be provided to the receiver-side prior to or near the beginning of a data transmission session (e.g., upon initialization).

The clock generator 125 may also be configured to synthesize a channel rate clock 135, which may then be used by serializers 140 to operate on input data 145 received from data encoding circuitry (not shown). Since the available bandwidth (based on the selected quantized channel rate) will tend to exceed the raw data rate (plus any data overhead), the data may be padded, prior to transmission, with additional null data such that the actual data rate approximates the selected quantized channel rate. In this fashion, once the receiver-side determines the applicable channel rate, it will necessarily also know the data rate, which is particularly useful in simplifying CDR operations in a variable data rate communication systems. The null data may further be encoded so as to ensure frequent transitions which are helpful in correcting clock drift.

Serializers 140 may be configured to provide serialized data 150 to known transmitter-circuitry (not shown) for transmission to a receiver-side at the appropriate channel rate (based on the channel rate clock 135) As will be described in more detail below, the channel rate clock 135 may be determined according to the following formula:

$$\text{Channel Rate Clock} = x * a * j$$

where,
$x$ = Ref_Clock 105;
$a$ = CRM 115; and
$j$ = data overhead, where the data overhead includes extra bits beyond the actual data payload required for transmission, such as bits used for synchronization, framing, forward error correction, rate multiplying, etc.

Referring now to FIG. 1B, depicted is one embodiment of receiver-side clock circuitry 155 configured to implement at least one aspect of the invention. Clock circuitry 155 may be used on a receiver-side of a data communication system in combination with other known decoding and data processing circuitry for receiving data (wired or wirelessly) from a transmitter-side. As with the transmitter-side clock circuitry 100 of FIG. 1A, the clock circuitry 155 on the receiver-side has particular relevance in communication systems which have a variable data transmission rate, and in which it is necessary on the receiver-side to recover the data rate or clock (i.e., data clock 130) from the transmitted signal.

The previously-provided CRM 115 may be stored in memory 165, which although shown as a separate memory may be combined with other receiver-side data storage, or may otherwise have any known configuration capable of storing the CRM 115 value. In addition, it should be appreciated that the Ref_Clock 105 is of the same frequency on the receiver-side as it is on the transmitter-side. In certain embodiments, the clock multiplier 170 may compute a rate divisor 175 based on the Ref_Clock 105 and the previously-provided CRM 115. In certain embodiments, the rate divisor 175 may be equal to 1/(Ref_Clock*CRM).

Continuing to refer to FIG. 1B, serialized data 150 may be first received from a transmitter-side and provided to CDR Circuitry 160. CDR Circuitry 160 may be configured to recover the data rate or clock (i.e., data clock 130) from the transmission. Since in certain embodiments the channel rate is essentially equal to the data rate (with the addition of the aforementioned null data), the data rate may be readily recoverably by dividing the channel rate by the rate divisor 175.

Figure 1C:
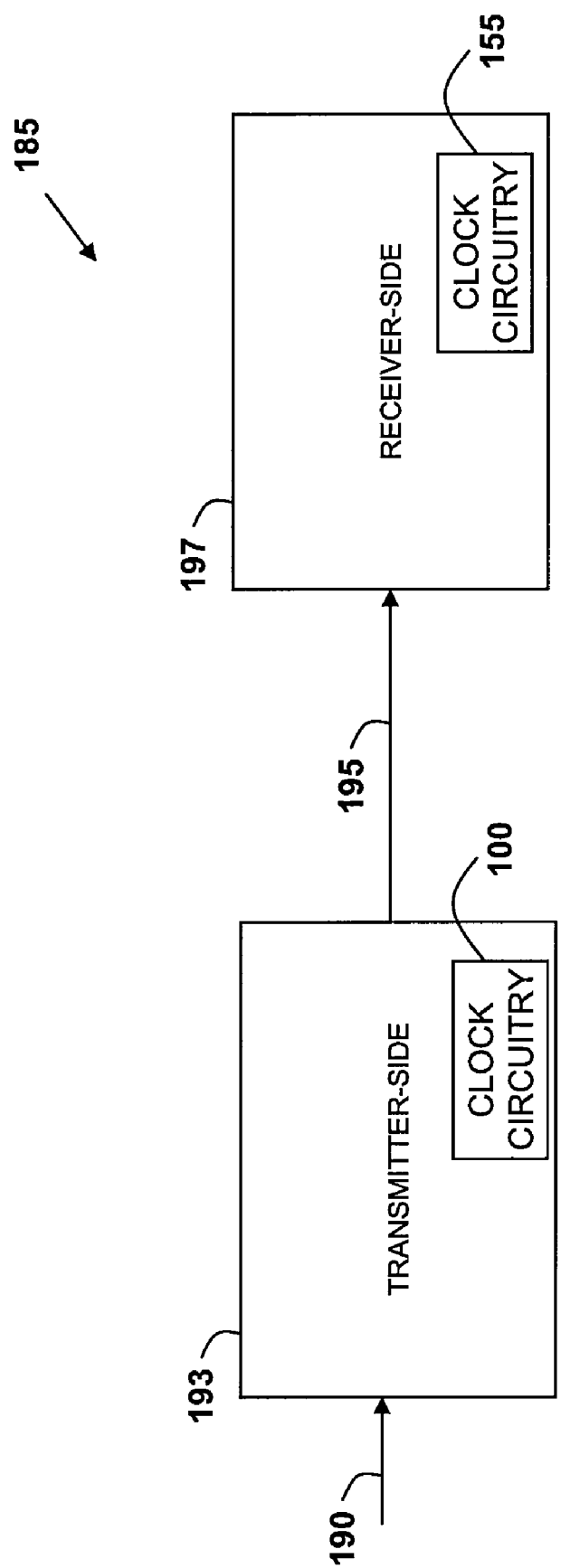
FIG. 1C is a system diagram of a communication system in which the transmitter-side clock circuitry of FIG. 1A and the receiver-side clock circuitry of FIG. 1B may be implemented.

FIG. 1C depicts one embodiments of a communication system 185 configured to implement one or more aspects of the invention. In particular, communication system 185 is comprised of a transmitter-side 193 which receives an input data stream 190 from any known data source. In addition to including the previously-described transmitter-side clock circuitry 100, the transmitter-side may further include various known circuitry associated with the receiving the input data stream, framing, encoding, processing, modulating and transmission of data over a wired and wireless link 195.

Communication system 185 further comprises a receiver-side 197 for receiving the data over the communication link 195, and which includes the previously-described receiver-side clock circuitry 155. Although not depicted, it should equally be appreciated that the receiver-side 197 will typically include known circuitry for receiving data, demodulating, decoding, processing received data.

Figure 2:
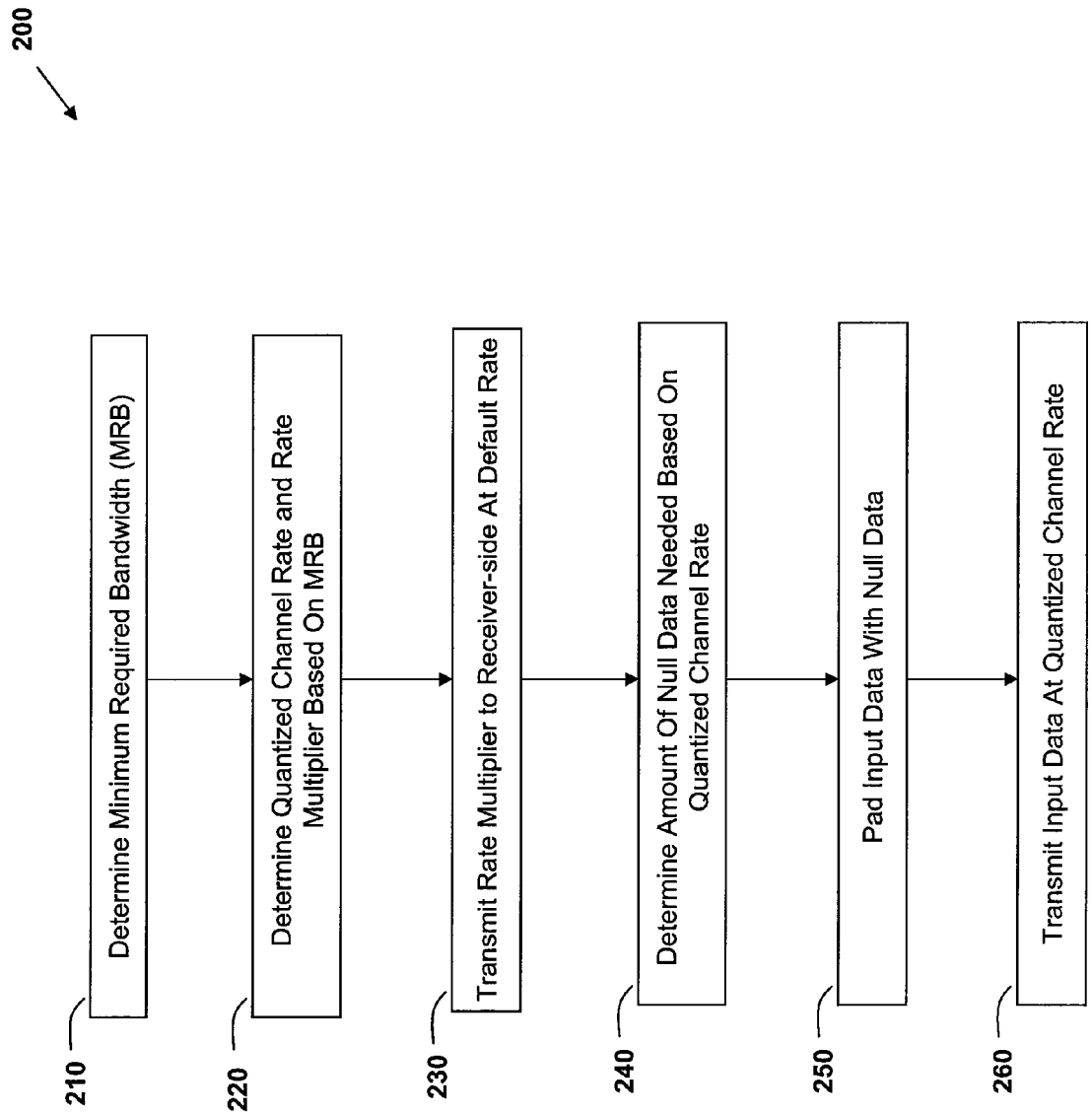
FIG. 2 is a flow diagram of one embodiment for carrying out one or more aspects of the invention of transmitting data using quantized channel rates.

Referring now to FIG. 2, depicted is one embodiment of a process 200 for carrying out one or more aspects of the invention. Process 200 corresponds to operations performed on the transmitter-side of a communication system (e.g., communication system 185) having a variable data transmission rate and/or which does not transmit a separate data clock from the transmitter-side to the receiver-side, thereby requiring the receiver-side to recover a data clock from the transmitted signal.

Process 200 begins at block 210 where the minimum required bandwidth for an incoming data stream (e.g., input data stream 190) may be first determined. To compute the minimum required bandwidth, it is helpful to know the payload data rate, number of bits and the overhead data rate. For example, the minimum required bandwidth could be computed by multiplying the payload data rate times (1+overhead), where the overhead is expressed as a fraction of the total stream that contains non-payload bits. This value would then be multiplied by the number of bits in the data stream to account for the conversion from parallel data to serial data. By way of providing a non-limiting example, assume the raw data is 60 MHz, 30-bit data, and that the overhead is 10% (i.e., 10% of the transmission stream is dedicated to non-payload data). In this case, the minimum required bandwidth would be equal to (60 MHz*1.1)*(30)=1.98 Gbps.

Based on the determined minimum required bandwidth from block 210, a quantized channel rate (and corresponding rate multiplier) may be determined at block 220. The quantized channel rate should preferably be higher than the minimum required bandwidth from block 210 and, in a preferred embodiment, be an integer multiple of the reference clock. Thus, continuing with the above example, and assuming a reference clock (i.e., Ref_Clock 105) of 110 MHz, the quantized channel rate may be computed to be 2.2 Gbps (110 MHz*20). This computed quantized channel rate is both higher than the previously-computed minimum required bandwidth (i.e., 1.98 Gbps), and is an integer multiple of the reference clock, thereby minimizing any computational overhead. While in this example a rate multiplier of 20 was used, a value of 19 could have been used as well. Similarly, a rate multiplier greater than 20 may be similarly used. Moreover, as will be described in more detail below with reference to FIG. 3, rather than determining the quantized channel rate/rate multiplier, in another embodiment a particular "mode" of communication may instead be determined, where each such mode corresponds to a predetermined channel rate.

Continuing to refer to FIG. 2, process 200 continues to block 230 where the rate multiplier determined at block 220 may be transmitted to the receiver-side (e.g., receiver-side 197). In certain embodiments, the rate multiplier information may be transmitted at a relatively slow "default rate" so as to increase the probability that the receiver-side will accurately receive and be able to decode the information. For example, the default rate may be a relatively low multiple of the reference clock (e.g., 5, 10, etc.). Additionally, the rate multiplier information may be provided to the receiver-side over an in-band communication link between the transmitter-side and receiver-side prior to or near the beginning of a data transmission session (e.g., upon initialization).

With the now-received rate multiplier information and the common reference clock, the receiver-side can readily deduce the quantized channel rate by simply multiplying the two together. However, in order for the receiver-side to perform the necessary CDR process, another aspect of the invention is to cause the total data rate over the communication link (e.g., communication link 195) to be essentially equal (e.g., ±0.1 Gbps) to the quantized channel rate, and hence also easily computed. To that end, in certain embodiments process 200 may continue to block 240 where the amount of null data needed to bring the total data rate up to the quantized channel rate may be determined. Referring back to the example provided above with respect to the operation of block 220, the data rate is 1.98 Gbps while the channel rate is 2.2 Gbps. Thus, 0.22 Gbps of null data would be added to the payload data (plus overhead) so that the channel rate and total data rate are essentially equal. In certain embodiments, the amount of null data to be determined at block 240 is essentially equal to the quantized channel rate minus the sum of the input payload data rate plus the overhead data rate.

Process 200 may then continue to block 250, where the previously-determined amount of null data may be packed into or otherwise added to the input data. While in one embodiment this operation may be performed by a transmitter-side encoder, it may equally be performed using any known circuitry for padding, packing or otherwise adding null data into a given input data stream so as to generate a combined data stream having a total data rate equal to the rate of the null data being added, plus the rate of the incoming data stream in question. Additionally, since it is generally desirable to have regular transitions in the data stream so as to phase-align the data clock, the null data may be scrambled using known scrambling circuitry to ensure frequency edge transitions.

Once any null data has been added to the input data stream, process 200 may continue to block 260 where the input data stream may be transmitted at the previously-determined quantized channel rate to the receiver-side over a wired or wireless communication link (e.g., communication link 195). Since the receiver-side will have already received the rate multiplier (or communication mode), and since the data rate is essentially equal (e.g., ±0.1 Gbps) to the channel rate by virtue of the added null data, the receiver-side will now readily be able perform any requisite CDR operations with only minimal processing.

Figure 3:
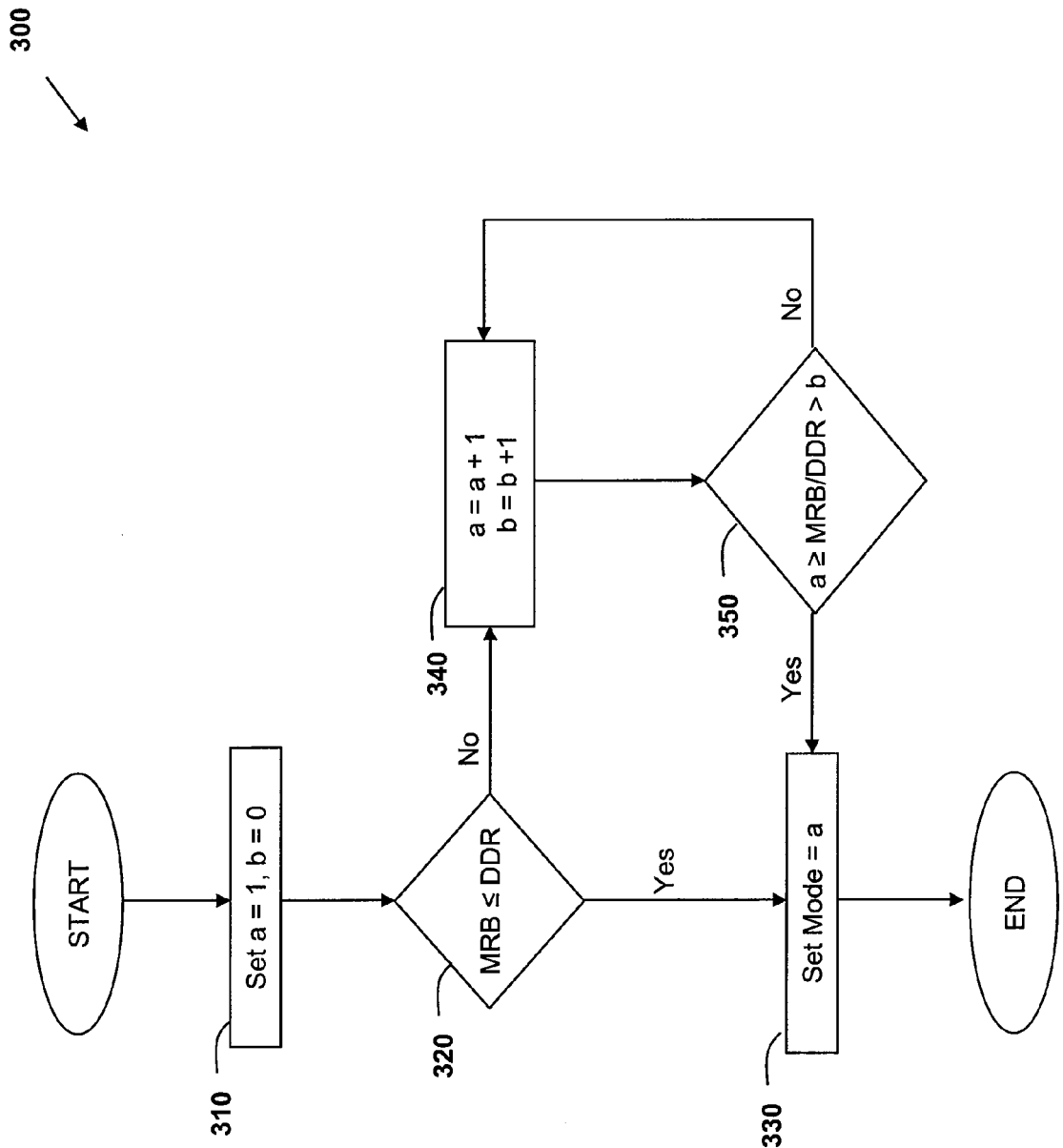
FIG. 3 is a flow diagram of a process for determining a transmission mode and corresponding quantized channel rate, in accordance with one embodiment of the invention.

Referring now to FIG. 3, depicted is one embodiment of a process 300 for performing the operations of block 220 of FIG. 2 by determining a mode in which the communication system will operate. In accordance with one embodiment of the invention, a communication system (e.g., communication system 185) implementing the invention may be configured to operate at one of a plurality of modes, where each such mode has been previously associated with a given quantized channel rate. By way of providing a non-limiting example, Mode 1 may correspond to a channel rate of 1 Gbps, Mode 2 may correspond to a channel rate of 2 Gbps, Mode 3 with 3 Gbps and so on. However, it should equally be appreciated that the plurality of modes may equally correspond with any other quantized channel rates. Regardless, once the applicable mode has been determined using process 300, that information may be used in connection with the other operations described above with reference to process 200 of FIG. 2.

Process 300 begins with the assumption that the raw data rate for a minimum required bandwidth for an input data stream is known. For example, the operations performed at block 210 of process 200 similarly may be used to determine the minimum required bandwidth used in process 300. Regardless of how the minimum required bandwidth is determined, process 300 begins at block 310 where one variable (a) is set equal to 1 and another variable (b) is equal to zero. A determination is then made at block 320 as to whether the previously-determined minimum required bandwidth is less than or equal to a default data rate. As referred to herein, the default data rate may be a predetermined rate which is the slowest at which the receiver-side and transmitter-side are configured to operate.

If it is determined at block 320 that the minimum required bandwidth is no greater than the default rate, then process 300 may continue to block 330 where the transmission mode is set to 1, i.e., the current value of variable a. At this point, the communication system will operate in Mode 1 and transmit data at what ever quantized channel rate has been previously associated with Mode 1. In addition, the rate multiplier or another identifier corresponding to Mode 1 may be transmitted to the receiver-side, as described above with reference to block 230 of FIG. 2.

If, on the other hand, it is determined at block 320 that the minimum required bandwidth is greater than the default rate, process 300 may continue to block 340 where both variable a and b are incremented by 1. In other embodiments, the variables a and b may be incremented by more or less than 1. Process 300 may then continue to block 350 where the quotient of the minimum required bandwidth divided by the default data rate (MRB/DDR) is first computed. This quotient is then compared to the then-current values of variables a and b, and a determination is made as to whether the quotient (MRB/DDR) is both greater than b and less than or equal to a. If not, process 300 reverts to block 340 where the variables a and b are again incremented until the quotient (MRB/DDR) satisfies both criteria of block 350 (i.e., greater than b but no greater than a.). At that point, process 300 is ready to continue to block 330 where the data transmission mode is set to the then-current value of variable a. (e.g., Mode 2, Mode 3, etc.), At this point, the communication system will operate in the selected mode and data will be transmitted at the quantized channel rate that was previously associated with the selected mode. In addition, the rate multiplier or another identifier corresponding to the selected mode may be transmitted to the receiver-side, as described above with reference to block 230 of FIG. 2.

Figure 4A:
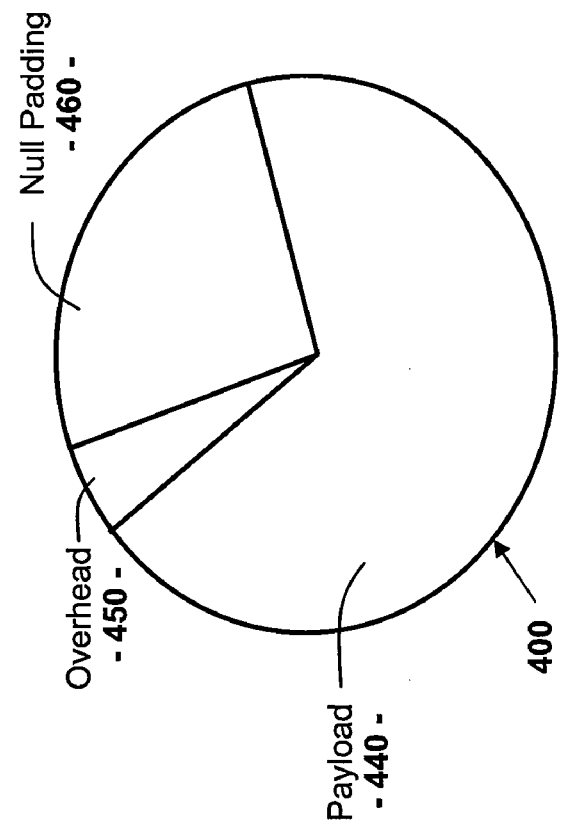
FIGS. 4A-4B depict graphical representations of how an input data stream may be padded using the aforementioned null data when the available bandwidth is constant and the input data rate is variable.
Figure 4B:
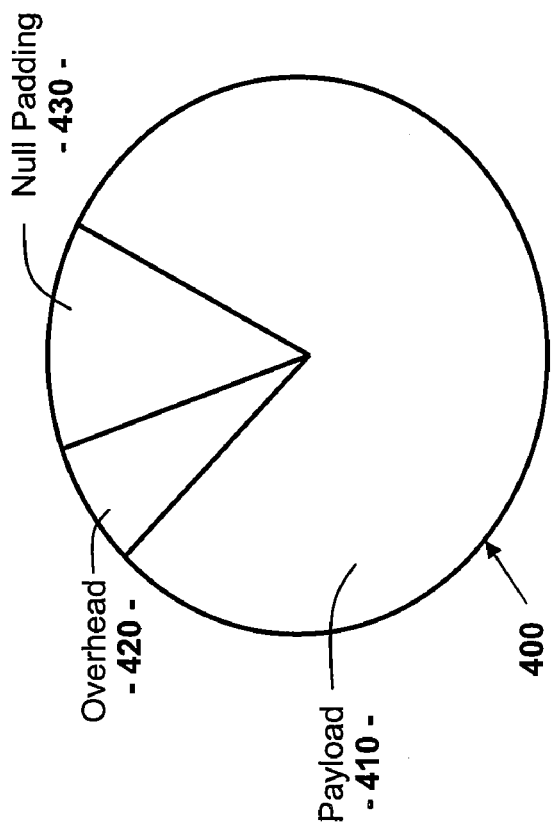

Referring now to FIGS. 4A-4B, depicted are graphical representations of how an input data stream may be padded using the aforementioned null data up to a given quantized channel rate. In particular, FIG. 4A depicts a pie-shaped representation of the total available bandwidth for a given quantized data rate ("available bandwidth 400"). The payload data rate 410 corresponds to the rate of payload data which is being provided to a transmitter-side by a content source (e.g., input data stream 190). Some portion of the available bandwidth is also allocated to an overhead data rate 420, which is associated with transmitting the payload data. In certain embodiments, the overhead data rate 420 may be represented as a basically fixed percentage of the payload data rate 410. The remainder of the available bandwidth 400 corresponding to the selected quantized channel rate may then be filled with null padding or null data 430 such that the actual total data rate is essentially equal to the previously-selected quantized channel rate, and hence readily known to receiver-side as described above.

Referring now to FIG. 4B, the total available bandwidth 400 remains the same as in FIG. 4A, however, the payload data rate 410 has been decreased. Moreover, since the overhead data rate 450 is likely to be directly proportional to the payload data rate 440, it too has been correspondingly reduced. Such decreases (or increases) are expected in variable rate communication systems, which makes CDR operations on the receiver-side much more difficult to perform for such systems. Thus, one aspect of the invention is to correspondingly increase the null padding 460 so that the actual total data rate remains essentially equal to the selected quantized channel rate, despite the decreased rate of incoming payload data.

Figure 5A:
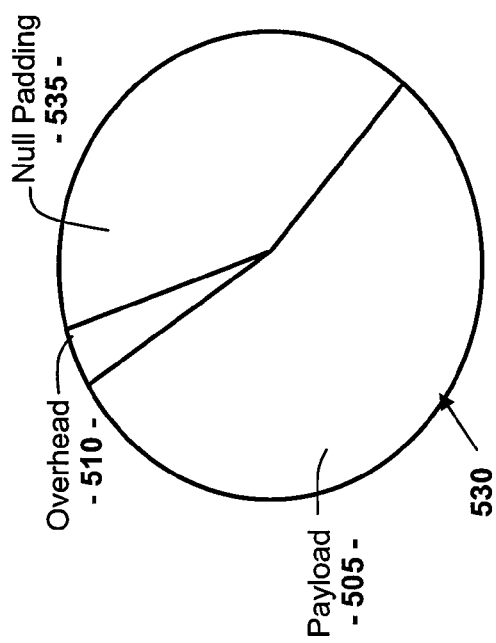
FIGS. 5A-5C depict graphical representations of how an input data stream may be padded using the aforementioned null data when the input rate is constant and the available bandwidth varies.
Figure 5B:
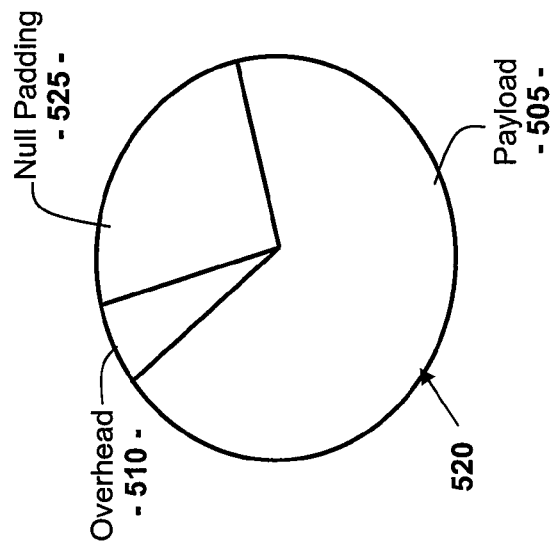
Figure 5C:
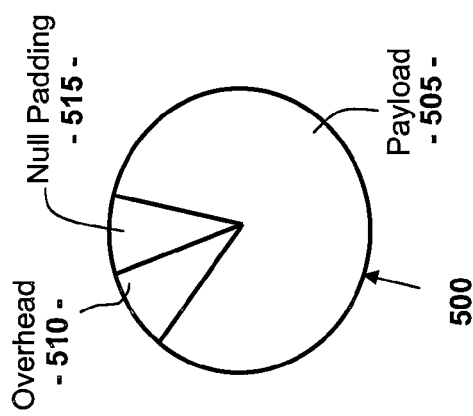

Referring now to FIGS. 5A-5C, depicted are graphical representations of how a given input data stream may be padded using the aforementioned null data as a function of different quantized channel rates. While FIGS. 4A-4B described above relate to how variable data may be padded for a given quantized channel rate, FIGS. 5A-5C depict how a fixed amount of data can be padded to account for different quantized channel rates which may be selected.

FIG. 5A depicts a pie-shaped representation of the total available bandwidth for a first selected quantized channel rate 500 (e.g., Mode 1 of FIG. 3). The payload data rate 505 corresponds to the rate of payload data which is being provided to a transmitter-side by a content source (e.g., input data stream 190). Some portion of the available bandwidth is also allocated to an overhead data rate 510, which is associated with transmitting the payload data. As shown, the remainder of the available bandwidth corresponding to the first quantized channel rate 500 may then be filled with null padding or null data 515 such that the actual total data rate being transmitted is essentially equal to the selected quantized channel rate, and hence readily recoverable on the receiver-side as described above.

FIG. 5B depicts a pie-shaped representation of the total available bandwidth for a second selected quantized channel rate 520 (e.g., Mode 2 of FIG. 3) which has been significantly increased from the selected quantized channel rate 500 of FIG. 5A. Since the payload data rate 505 and corresponding overhead data rate 510 remain the same, the amount of null padding or null data 525 correspondingly increases such that the actual total data rate is again essentially equal to the selected quantized channel rate (i.e., second selected quantized channel rate 520).

Similarly, FIG. 5C depicts another pie-shaped representation of the total available bandwidth, but this time for a third selected quantized channel rate 530 (e.g., Mode 3 of FIG. 3), which has again been significantly increased from the channel rates of FIGS. 5A and 5B. Again, since the payload data rate 505 and corresponding overhead data rate 510 have remained the same, the amount of null padding or null data 535 correspondingly increases such that the actual total data rate is again essentially equal to the third selected quantized channel rate 530. In this fashion, the receiver-side CDR process may be significantly simplified since the receiver-side can readily recover the data clock using its known reference clock and the previously-provided rate multiplier. In addition, padding the data stream with null data may further provide the frequency transitions that are most useful for performing data clock phase alignments.

While the invention has been described in connection with various embodiments, it should be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of transmitting data over a communication link between a transmitter-side and receiver-side of a communication system using quantized channel rates, the method comprising the acts of:
   determining a minimum required bandwidth for a data stream on the transmitter-side of the communication system;
   determining a quantized channel rate based on the minimum required bandwidth, wherein the quantized channel rate is equal to the product of a reference clock of the communication system multiplied by a rate multiplier;
   transmitting the rate multiplier to the receiver-side at a default data rate;
   determining an amount of null data based a difference between a quantized data rate and the minimum required bandwidth;
   padding the data stream with said amount of null data; and
   transmitting the data stream padded with null data at the quantized channel rate over the communication link.

2. The method of claim 1, wherein the rate multiplier is an integer.

3. The method of claim 1, wherein transmitting the rate multiplier comprises transmitting the rate multiplier prior to transmitting said data stream.

4. The method of claim 1, wherein transmitting the rate multiplier comprises transmitting the rate multiplier to the receiver-side at the default data rate during an initialization period.

5. The method of claim 1, wherein determining the quantized channel rate comprised selecting a mode from among a plurality of available modes based on the minimum required bandwidth and a default data rate.

6. The method of claim 5, wherein each of the plurality of available modes is associated with a corresponding plurality of quantized channel rates.

7. The method of claim 1, wherein determining the amount of null data comprises determining the amount of null data needed to cause a rate of the data stream after padding with said null data to be essentially equal to the quantized channel rate.

8. The method of claim 1, wherein the default data rate is less than the quantized channel rate at which the data stream is transmitted over the communication link.

9. The method of claim 1, wherein the receiver-side performs a clock and data recovery operation without the use of a separate data clock transmitted by the transmitter-side side over the communication link.

10. The method of claim 9, wherein the communication system is configured to transmit and receive data at variable rates.

11. The method of claim 1, further comprising performing a clock and data recovery operation on the receiver-side based on the reference clock and rate multiplier.

12. A communication system for transmitting data using quantized channel rates, the communication system comprising:
   a receiver-side configured to receive data over a communication link; and
   a transmitter-side configured to transit data to the receiver-side over the communication link, wherein the transmitter-side is further configured to:
      determine a minimum required bandwidth rate for a data stream,
      determine a quantized channel rate based on the minimum required bandwidth,
   wherein the quantized channel rate is equal to the product a reference clock of the communication system multiplied by a rate multiplier,
      transmit the rate multiplier to the transmitter-side at a default data rate,
      determine an amount of null data based a difference between a quantized data rate and the minimum required bandwidth,
      pad the data stream with said amount of null data, and
      transmit the data stream padded with null data at the quantized channel rate over the communication link.

13. The communication system of claim 12, wherein the rate multiplier is an integer.

14. The communication system of claim 12, wherein the transmitter-side is configured to transmit the rate multiplier prior to transmitting said data stream.

15. The communication system of claim 12, wherein the transmitter-side is configured to transmit the rate multiplier at the default data rate during an initialization period.

16. The communication system of claim 12, wherein the transmitter-side is configured to determine the quantized channel rate by selecting a mode from among a plurality of available modes based on the minimum required bandwidth and a default data rate.

17. The communication system of claim 16, wherein each of the plurality of available modes is associated with a corresponding plurality of quantized channel rates.

18. The communication system of claim 12, wherein the transmitter-side is configured to determine the amount of null data that is needed to cause a rate of the data stream after padding with said null data to be essentially equal to the quantized channel rate.

19. The communication system of claim 12, wherein the default data rate is less than the quantized channel rate at which the data stream is transmitted over the communication link.

20. The communication system of claim 12, wherein the receiver-side is configured to perform a clock and data recovery operation without the use of a separate data clock transmitted by the transmitter-side side over the communication link.

21. The communication system of claim 20, wherein the communication system is configured to transmit and receive data at variable rates.

22. The communication system of claim 12, wherein the receiver-side is further configured to perform a clock and data recovery operation on the receiver-side based on the reference clock and rate multiplier.

* * * * *

UNITED STATES PATENT AND TRADEMARK OFFICE
CERTIFICATE OF CORRECTION

PATENT NO. : 8,315,332 B2  Page 1 of 1
APPLICATION NO. : 12/399837
DATED : November 20, 2012
INVENTOR(S) : Hardacker et al.

It is certified that error appears in the above-identified patent and that said Letters Patent is hereby corrected as shown below:

In the CLAIMS:
Claim 9, column 9, line 59, delete "transmitter-side side" and insert --transmitter-side--.
Claim 12, column 10, line 9, delete "transit" and insert --transmit--.
Claim 12, column 10, line 15-16, delete "product a" and insert --product of a--.
Claim 20, column 10, line 54, delete "transmitter-side side" and insert --transmitter-side--.

Signed and Sealed this
Second Day of April, 2013

Teresa Stanek Rea
*Acting Director of the United States Patent and Trademark Office*